United States Patent
Okano et al.

(10) Patent No.: US 11,982,644 B2
(45) Date of Patent: May 14, 2024

(54) LIFE ESTIMATION APPARATUS FOR ACCUMULATOR AND LIFE EXTENSION METHOD FOR PRESSURE ACCUMULATOR

(71) Applicant: JFE Steel Corporation, Tokyo (JP)

(72) Inventors: Hiroshi Okano, Tokyo (JP); Akihide Nagao, Tokyo (JP); Nobuyuki Ishikawa, Tokyo (JP); Kazuki Matsubara, Tokyo (JP); Toshio Takano, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 503 days.

(21) Appl. No.: 17/254,442

(22) PCT Filed: Jun. 21, 2019

(86) PCT No.: PCT/JP2019/024747
§ 371 (c)(1),
(2) Date: Dec. 21, 2020

(87) PCT Pub. No.: WO2019/245035
PCT Pub. Date: Dec. 26, 2019

(65) Prior Publication Data
US 2021/0270779 A1    Sep. 2, 2021

(30) Foreign Application Priority Data
Jun. 22, 2018   (JP) .................. 2018-118453

(51) Int. Cl.
*G01N 29/14*   (2006.01)
*G01N 29/48*   (2006.01)

(52) U.S. Cl.
CPC ............ *G01N 29/14* (2013.01); *G01N 29/48* (2013.01); *G01N 2291/0258* (2013.01)

(58) Field of Classification Search
CPC . G01N 29/14; G01N 29/48; G01N 2291/0258
See application file for complete search history.

(56) References Cited

U.S. PATENT DOCUMENTS 8,240,209 B2 *   8/2012   Murakami ............ G01N 29/14
                                                             73/587
2008/0302186 A1   12/2008   Bohse et al.
(Continued)

FOREIGN PATENT DOCUMENTS

CN   102507744 A   6/2012
CN   103216725 A   7/2013
(Continued)

OTHER PUBLICATIONS

Changhong "Research of Detection of a Crack on Pressure Vessel" (Year: 2011).*
(Continued)

*Primary Examiner* — Natalie Huls
*Assistant Examiner* — Sharad Timilsina
(74) *Attorney, Agent, or Firm* — DLA Piper LLP (US)

(57) ABSTRACT

A life estimation apparatus for a pressure accumulator estimates the life of the pressure accumulator based on an AE signal for the pressure accumulator. The life estimation apparatus includes: an AE sensor that is provided at the pressure accumulator and detects the AE signal; and an estimation unit that sets a point of time at which the AE sensor detects a damage AE signal that is generated from the pressure accumulator because of damage of a material during use of the pressure accumulator, as a minimum initial flaw generation time point that is a point of time at which a minimum initial flaw of the pressure accumulator that is detected by a non-destructive inspection method is generated in shipping of the pressure accumulator.

9 Claims, 5 Drawing Sheets

(56) References Cited

U.S. PATENT DOCUMENTS

| | | | |
|---|---|---|---|
| 2009/0116533 | A1 | 5/2009 | O'Connell et al. |
| 2010/0107765 | A1 | 5/2010 | Murakami et al. |
| 2014/0165729 | A1* | 6/2014 | Ji .......................... G01N 29/14 |
| | | | 73/587 |
| 2014/0229149 | A1 | 8/2014 | Guan et al. |
| 2017/0363587 | A1 | 12/2017 | Takamine et al. |

FOREIGN PATENT DOCUMENTS

| | | | |
|---|---|---|---|
| CN | 103529128 | A | 1/2014 |
| CN | 107014668 | A | 8/2017 |
| CN | 107850578 | A | 3/2018 |
| JP | 50-110688 | | 8/1975 |
| JP | 2009-115795 | | 5/2009 |
| JP | 2012-242336 | | 12/2012 |
| JP | 2016-509670 | | 3/2016 |
| JP | 2017-223564 | | 12/2017 |
| JP | 2017223564 | A * | 12/2017 |
| WO | 01-50122 | | 7/2001 |
| WO | 2003/081228 | | 10/2003 |
| WO | 2009/008515 | | 1/2009 |

OTHER PUBLICATIONS

Baldev "Frontiers in NDE research nearing maturity for exploration to ensure structural integrity of pressure retaining components", (Year: 2006).*

The Extended European Search Report dated Feb. 17, 2022, of counterpart European Patent Application No. 19823505.3.

K.C. Liu et al., "On-Stream Inspection for Pitting Corrosion Defect of Pressure Vessels for Intelligent and Safe Manufacturing," The International Journal of Advanced Manufacturing Technology, Springer, London, vol. 19, No. 5, pp. 1957-1966, Dec. 29, 2016.

C. Tong et al., "Research of Detection of a Crack on Pressure Vessel Based on Both Acoustic Emission Diagnosis and Ultrasonic Testing," Mechanic Automation and Control Engineering (MACE), pp. 1510-1513, Jul. 15, 2011.

B. Raj et al., "Frontiers in NDE Research Nearing Maturity for Exploitation to Ensure Structural Integrity of Pressure Retaining Components," International Journal of Pressure Vessels and Piping, Elsevier Science Publishers, vol. 83, No. 5, pp. 322-335, Retrieved May 1, 2006.

C.B. Scruby et al., "An Assessment of Acoustic Emission for Nuclear Pressure Vessel Monitoring," Progress in Nuclear Energy, vol. 11, No. 3, pp. 275-297, Retrieved Jan. 1, 1983.

Examination Report dated Jul. 20, 2021, counterpart of Indian Application No. 202027055037, along with an English translation.

First Office Action dated Aug. 31, 2023, of counterpart Chinese Patent Application No. 201980041861.5, along with an English translation.

Communication Pursuant to Article 94(3) EPC dated Feb. 13, 2024, of counterpart European Patent Application No. 19 823 505.3.

Second Office Action dated Mar. 14, 2024, of counterpart Chinese Patent Application No. 201980041861.5, along with an English translation.

* cited by examiner

DISTANCE m FROM AE SENSOR 11b

LIFE ESTIMATION APPARATUS FOR ACCUMULATOR AND LIFE EXTENSION METHOD FOR PRESSURE ACCUMULATOR

TECHNICAL FIELD

This disclosure relates to a life estimation apparatus for a pressure accumulator that is sealed, with a high-pressure gas such as hydrogen or another kind of gas, enclosed in the pressure accumulator, and a life extension method for the pressure accumulator.

BACKGROUND

In an existing technique, a diagnosis is made using acoustic emission (hereinafter referred to as AE) to determine the life of a bearing provided in a rotary machine (see Japanese Unexamined Patent Application Publication No. 2012-242336, for example). In the technique disclosed in Japanese Unexamined Patent Application Publication No. 2012-242336, a reference maximum amplitude value of an AE signal and a maximum amplitude value of an AE signal for a bearing that is in use are compared to each other, to thereby estimate the life of the bearing as the result of a diagnosis.

The estimation of a life based on an AE signal can also be applied to a pressure accumulator that is sealed, with a high-pressure gas such as hydrogen, for example, enclosed in the pressure accumulator. It should be noted that in the technique disclosed in Japanese Unexamined Patent Application Publication No. 2012-242336, the maximum amplitude value of the AE signal is periodically acquired, and the life of the bearing is estimated by a diagnosis. A repetitive lifetime diagnosis is unsuitable for a pressure accumulator whose life is estimated, for example, only by annual safety inspection.

It could therefore be helpful to provide a life estimation apparatus for a pressure accumulator that easily estimates the life of the pressure accumulator based on AE signals, and a life extension method for the pressure accumulator.

SUMMARY

We thus provide:

[1] A life estimation apparatus for a pressure accumulator estimates a life of the pressure accumulator based on an AE signal for the pressure accumulator, and includes:
   an AE sensor provided at the pressure accumulator, and configured to detect the AE signal; and
   an estimation unit configured to set a point of time at which the AE sensor detects a damage AE signal that is generated from the pressure accumulator because of damage of a material during use of the pressure accumulator, as a minimum initial flaw generation time point that is a point of time at which a minimum initial flaw of the pressure accumulator that is detected by a non-destructive inspection method is generated in shipping of the pressure accumulator.

[2] In the life estimation apparatus of the above item [1], two or more AE sensors including the AE sensor are provided, and
   the estimation unit locates a fatigue damage part of the pressure accumulator based on a relative difference between damage AE signals detected by the two or more AE sensors.

[3] The life estimation apparatus of the above item [1] or [2], further including a non-destructive sensor configured to detect a fatigue crack depth according to the non-destructive inspection method,
   wherein the non-destructive sensor performs a detection operation to detect as the fatigue crack depth, a depth of a fatigue damage part of the pressure accumulator at the minimum initial flaw generation time point, and when the fatigue crack depth is not detected, the estimation unit determines that a minimum flaw crack that is to be detected by the non-destructive sensor at the minimum initial flaw generation time point is generated, and estimates an allowable fatigue life of the pressure accumulator from the minimum flaw crack.

[4] In the life estimation apparatus of the above item [1] or [2], from the damage AC signal, the AE sensor detects as a fatigue crack depth, a depth of a fatigue damage part of the pressure accumulator at the minimum initial flaw generation time point, and the estimation unit determines that a flaw crack corresponding to a value of the AE signal that corresponds to a fatigue damage degree is generated, and estimates an allowable fatigue life of the pressure accumulator from the flaw crack.

[5] In the life estimation apparatus of any one of the above items [1] to [4], the pressure accumulator includes:
   a container made of metal and having an opened portion; and
   a lid member provided at the opened portion of the container to close the opened portion.

[6] In the life estimation apparatus for the pressure accumulator of the above item [5], the AE sensor is provided at one or both of the container and the lid member.

[7] In the life estimation apparatus of the above item [5] or [6],
   the container is a metallic cylinder member having both end portions that are opened, and
   the lid member closes the opened end portions of the metallic cylinder member.

[8] In the life estimation apparatus of the above item [7], the pressure accumulator includes a carbon-fiber reinforced resin member that covers an outer circumferential portion of the metallic cylinder member.

[9] A life extension method for the pressure accumulator includes a step of removing a fatigue damage part to extend the life of the pressure accumulator, when the AE sensor detects the damage AE signal in the life estimation apparatus of any one of claims 1 to 8.

In the life estimation apparatus for the pressure accumulator, when the AE sensors detect damage AE signals generated from the pressure accumulator because of a damage of material during use of the pressure accumulator, the point of time at which the damage AE signals are detected is set as the minimum initial flaw generation time point that is the point of time at which a minimum initial flaw of the pressure accumulator that is detected by the non-destructive inspection method is generated in shipping of the pressure accumulator. Therefore, with reference to the point of time at which the AE sensors detect the damage AE signals for the first time, it is assumed that a fatigue damage comparable to the minimum initial flaw generated at the time of the above shipping is generated, and it is possible to determine as a prediction that the fatigue damage will generate based on a previously investigated initial flaw characteristic from the fatigue damage comparable to the minimum initial flaw at the time of the shipping, and also possible to estimate the life of the pressure accumulator. Therefore, for example, even by annual safety inspection, it is possible to estimate the life of the pressure accumulator at the point of time at which first damage AE signals are detected. Thus, it is possible to easily estimate the life of the pressure accumulator based on the AE signals.

Furthermore, in the life extension method for the pressure accumulator, when the AE sensors detect the damage AE signals, the fatigue damage part is removed, and the life of the pressure accumulator is extended. Thereby, the fatigue damage part is removed, and the life of the pressure accumulator can be further extended.

Figure 1:
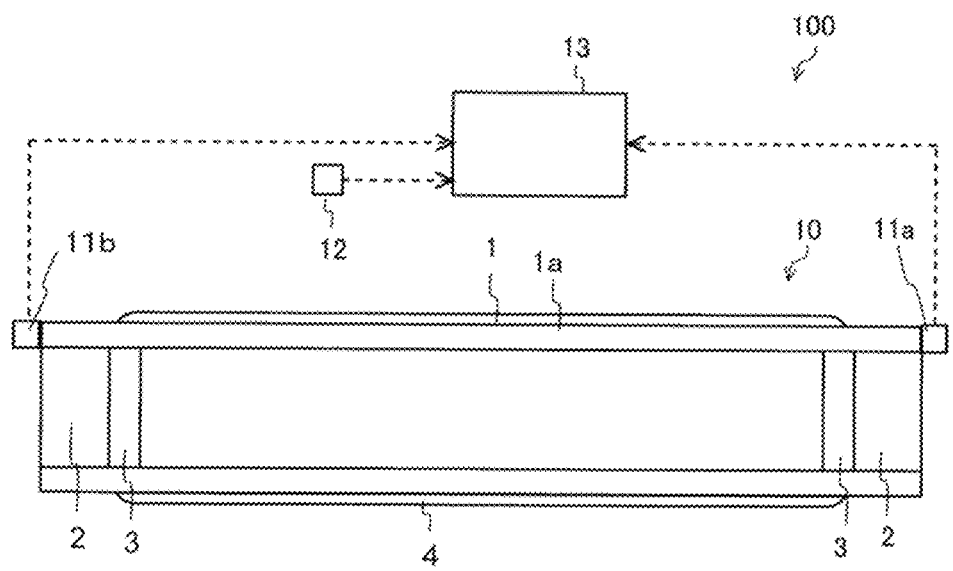
FIG. 1 is a schematic configuration diagram illustrating a life estimation apparatus for a pressure accumulator, according to an example.

REFERENCE SIGNS LIST 1 container
1a metallic cylinder member
2 lid member
3 sealing member
4 carbon-fiber reinforced resin member
10 accumulator
11a, 11b AE sensor
12 non-destructive sensor
13 estimation unit
100 life estimation apparatus

DETAILED DESCRIPTION

A pressure accumulator according to a preferred example will be described below in detail with reference to the drawings. The configuration described below is a preferred specific example of the pressure accumulator. Therefore, the following description includes various limitations concerning technically preferred configurations. However, the scope of this disclosure is not limited to such configurations unless the disclosure contains a description to the effect that a configuration is limited as described herein.

Configuration of Life Estimation Apparatus 100 for Accumulator 10

FIG. 1 is a schematic configuration diagram illustrating a life estimation apparatus 100 for a pressure accumulator 10, according to an example. As illustrated in FIG. 1, the life estimation apparatus 100 includes a pressure accumulator 10, two AE sensors 11a and 11b, a non-destructive sensor 12 and an estimation unit 13. The life estimation apparatus 100 estimates the life of the pressure accumulator 10, based on AE signals for the pressure accumulator 10.

Accumulator 10

In the pressure accumulator 10, hydrogen is stored, for example, in a hydrogen station. The pressure accumulator 10 includes a container 1 that is made of metal and that has opened portions, and lid members 2 that are provided at the opened portions of the container 1 to close the opened portions. To be more specific, the container 1 is a metallic cylinder member 1a having the opening portions at both end portions of the metallic cylinder member 1a, and the lid members 2 close the respective opened portions at the both end portions of the metallic cylinder member 1a. On inner sides of the lid members 2 in the container 1, sealing members 3 that seal the inside of the container 1 are provided. In the container 1, a carbon-fiber reinforced resin member 4 is provided to cover an outer circumferential portion of the metallic cylinder member 1a. The carbon-fiber reinforced resin member 4 is provided to secure a mechanical strength of the pressure accumulator 10 that is a required pressure resistance, and is wound in such a manner as to cover a storage member at an outer circumference surface of the metallic cylinder member 1a.

Metallic Cylinder Member 1a

The metallic cylinder member 1a is made of a low-alloy steel, for example. That is, the metallic cylinder member 1a is made of a material containing any one of chrome-molybdenum steel, nickel-chrome-molybdenum steel, manganese-chrome steel, manganese steel and boron-containing steel, for example.

Carbon-Fiber Reinforced Resin Member 4

The carbon-fiber reinforced resin member 4 is a layer that ensures the mechanical strength of the pressure accumulator 10 that is a required pressure resistance, and is wound to cover the storage member on the outer circumference surface of the metallic cylinder member 1a. The carbon-fiber reinforced resin member 4 is a composite material in which a carbon fiber is used as a reinforcement and is impregnated with a resin to enhance the strength and, for example, a PAN based carbon fiber or a PITCH based carbon fiber is used.

The PAN based carbon fiber is used for various purposes, for example, for aircraft, and is widely spread. The PITCH based carbon fiber has a lower strength than that of the PAN based carbon fiber, but has a higher elastic modulus and thus has a higher stiffness than those of the PAN based carbon fiber. For example, the Young's modulus of the PITCH based carbon fiber is 620 GPa or 780 GPa, whereas the Young's modulus of the PAN based carbon fiber is 230 GPa. Thus, the PITCH based carbon fiber has a high elastic modulus and thus has a high stiffness compared to the PAN based carbon fiber. By contrast, the tensile strength TS of the PITCH based carbon fiber is 3600 GPa, whereas the tensile strength TS of the PAN based carbon fiber is 5000 GPa. Thus, the PAN based carbon fiber has a higher strength than that of the PITCH based carbon fiber.

Lid Member 2

The lid members 2 are attached to the end portions of the metallic cylinder member 1a and used to close the metallic cylinder member 1a. In at least one of the lid members 2, a valve not illustrated is provided, and is used to enclose or release a substance in or from the metallic cylinder member.

In the lid member 2 or the lid members 2, a through-hole or through-holes are formed for connection of the valve or valves.

AE Sensors 11a and 11b

The two AE sensors 11a and 11b are provided at the pressure accumulator 10, and each detect an AE signal. The number of the AE sensors 11a and 11b to be provided is one or more, and preferably, should be two or more. When two or more AE sensors 11a and 11b are provided, it is possible to locate a fatigue damage part of the pressure accumulator 10 based on a relative difference between AE signals detected by the two or more AE sensors 11a and 11b. The two AE sensors 11a and 11b are provided at the both end portions of the container 1. One or more AE sensors 11a and 11b may be provided at the container 1 and/or the lid member or members 2. The AE sensors 11a and 11b are set on a surface of a target material, and each detect an AE wave generated by formation of a crack in the material, as an AE signal. The AE sensors 11a and 11b may be set at the pressure accumulator 10 only at the time at which a safety inspection is made. That is, it is not indispensable that the AE sensors 11a and 11b are set at all times at the pressure accumulator 10. The two AE sensors 11a and 11b are each used to detect a damage AE signal generated from the pressure accumulator 10 because of damage of the material during use of the pressure accumulator 10. The damage AE signal generated because of the above damage includes an AE signal generated because of a fatigue damage.

Non-Destructive Sensor 12

The non-destructive sensor 12 detects a fatigue crack depth that is the depth of a fatigue crack, according to a non-destructive inspection method. As the non-destructive inspection method for use in the non-destructive sensor 12, for example, an ultrasonic testing, a magnetic particle testing or an eddy current testing is used. Of these methods, preferably, the eddy current testing, which enables a crack having a size of 0.1 mm or more to be detected, should be used. Therefore, the non-destructive sensor 12 detects the fatigue crack depth according to the eddy current testing. The non-destructive sensor 12 may be set at the pressure accumulator 10 only when the AE sensors 11a and 11b each detect an AE signal indicating that a crack is formed in the material. That is, it is not indispensable that the non-destructive sensor 12 is set at all times at the pressure accumulator 10.

Estimation Unit 13

Figure 2:
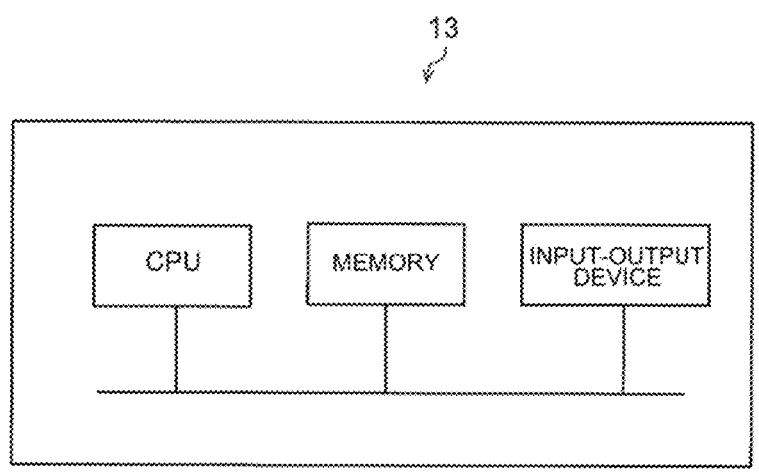
FIG. 2 is a block diagram illustrating an estimation unit according to the example.

FIG. 2 is a block diagram illustrating the estimation unit 13 according to the example. As illustrated in FIG. 2, the estimation unit 13 is a processing circuit provided with a microcomputer that includes a CPU, a memory such as a ROM and a RAM, and an input/output device such as an I/O port. The estimation unit 13 receives signals from the two AE sensors 11a and 11b and the non-destructive sensor 12, wirelessly or through a communication wire. The estimation unit 13 may be set at the pressure accumulator 10 only at the time at which the safety inspection is performed; that is, it is not indispensable that the estimation unit 13 is set at all times at the pressure accumulator 10.

When the AE sensors 11a and 11b detect damage AE signals generated from the pressure accumulator 10 because of damage of the material during use of the pressure accumulator the estimation unit 13 determines the time point at which the AE signals are detected as a minimum initial flaw generation time point that is the time point at which a minimum initial flaw at the pressure accumulator 10 is generated in shipping the pressure accumulator 10, the detection of generation of the minimum initial flaw being detected by the non-destructive inspection method. As the non-destructive inspection method for use in detection of generation of the minimum initial flaw at the pressure accumulator 10 in the shipping of the pressure accumulator 10, for example, an ultrasonic testing, a magnetic particle testing or an eddy current testing is used. Of these methods, preferably, the magnetic particle testing, which enables a 0.3 mm crack to be detected, should be used. Therefore, the magnetic particle testing is used in detection of generation of the minimum initial flaw at the pressure accumulator 10 in the shipping of the pressure accumulator and 0.3 mm is set as the size of the minimum initial flaw. When the AE sensors 11a and 11b are set at all times at the pressure accumulator 10, first damage AE signals can be immediately detected for the estimation unit 13. When the AE sensors 11a and 11b are set at the pressure accumulator 10 only at the time when the safety inspection is performed, the frequency of the safety inspection is set such that first damage AE signals can be detected for the estimation unit 13 when the size of the crack is smaller than or equal to 0.3 mm, which is the size of the minimum initial flaw that can be detected in the magnetic particle testing.

In addition, the estimation unit 13 specifies a fatigue damage part of the pressure accumulator 10 based on a relative difference between damage AE signals generated as a result of detection by the two AE sensors 11a and 11b.

Using two or more AE sensors 11a and 11b, the estimation unit 13 may detect a fatigue crack depth that is the depth of a fatigue crack part of the pressure accumulator 10 at the minimum initial flaw generation time point, from the damage AE signal. Furthermore, the estimation unit 13 may determine that a flaw crack whose size corresponds to the values of the damage AE signals that correspond to a fatigue damage degree is generated, and may estimate an allowable fatigue life of the pressure accumulator 10 from the above flaw crack.

Estimation Method of Life Estimation Apparatus 100 for Accumulator 10

Figure 3:
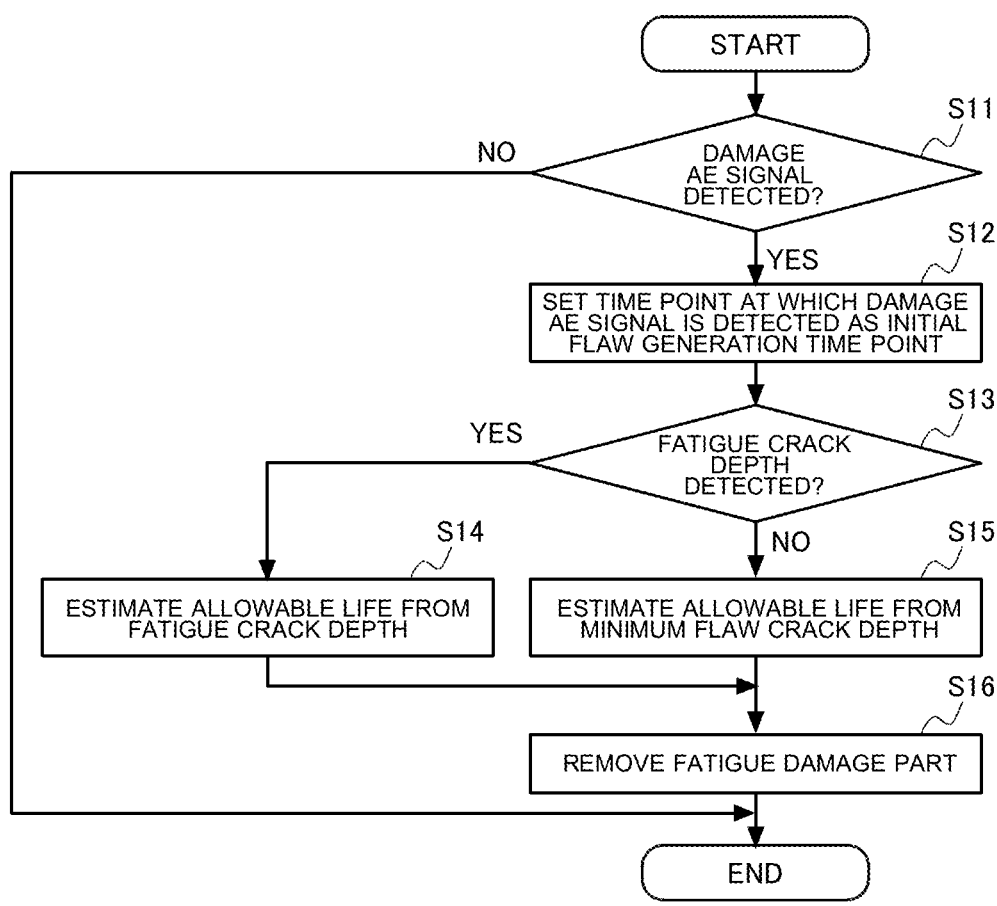
FIG. 3 is a flowchart of an estimation method for the life estimation apparatus for the pressure accumulator according to the example.

FIG. 3 is a flowchart indicating an estimation method of the life estimation apparatus 100 for the pressure accumulator 10 according to the example. The processing according to the estimation method may be applied only at the time when the safety inspection is performed. That is, it is not indispensable that the processing according to the estimation method is applied at all time.

In step S11, the two AE sensors 11a and 11b detect damage AE signals from the pressure accumulator 10, and the estimation unit 13 determines whether the damage AE signals are detected or not. When in step S11, the AE signals are detected, the step to be carried out proceeds to step S12. When in step S11, the AE signals are not detected, the processing ends. As described above, the detection of the damage AE signals from the pressure accumulator 10 by the two AE sensors 11a and 11b at least at a safety inspection frequency at which first damage AE signals can be detected when the size of a crack is smaller than or equal to at least 0.3 mm, which is the size of the minimum initial flaw that can be detected by the magnetic particle testing.

In step S12, when the AE sensors 11a and 11b detect damage AE signals generated from the pressure accumulator 10 because of damage of the material, the estimation unit 13 sets the time point at which the AE signals are detected, as the minimum initial flaw generation time point that is the time point at which the minimum initial flaw of the pressure accumulator 10 that is detected by the magnetic particle testing is generated in the shipping of the pressure accumulator 10. In this example, since the two AE sensors 11a and 11b are provided, the estimation unit 13 locates a fatigue damage part of the pressure accumulator 10 based on the relative difference between the damage AE signals detected by the two AE sensors 11a and 11b. After the process of step S12, the processing proceeds to step S13.

Figure 4:
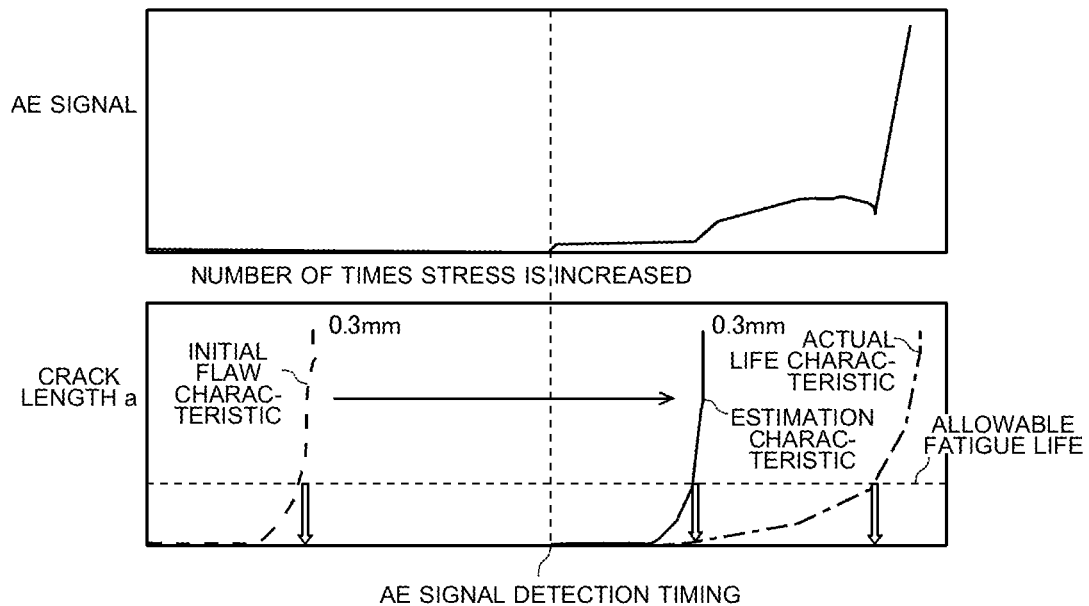
FIG. 4 is an explanatory diagram illustrating a correlation between AE signals detected by AE sensors and an estimation characteristic for the life of the pressure accumulator according to the example.

FIG. 4 is an explanatory diagram illustrating a correlation between the AE signals detected by the AE sensors 11a and 11b and an estimation characteristic for the life of the pressure accumulator 10 according to the example. As illustrated in FIG. 4, when the AE sensors 11a and 11b detect damage AE signals, the estimation unit 13 sets the time point at which the AE signals are detected, as the minimum initial flaw generation time point, that is, the time point at which a minimum initial flaw having a size of 0.3 mm which is detected by the magnetic particle testing is generated in the shipping of the pressure accumulator 10, whose fatigue characteristic is indicated by a dotted line. Then, the estimation unit 13 temporarily estimates an allowable fatigue life of the pressure accumulator 10 from the crack having a size of 0.3 mm, as an estimation characteristic that is indicated by a solid line. The estimation characteristic for the life obtained from the minimum initial flaw whose size is 0.3 mm is previously investigated. In this process, as a subsequent step is still present, the estimation characteristic is determined as a temporary estimation characteristic, and the allowable fatigue life of the pressure accumulator 10 is estimated. However, the allowable fatigue life of the pressure accumulator 10 may be definitely set based on the estimation characteristic. As a result, the estimation characteristic further approaches an actual life characteristic of an actual life, which is indicated by a dash-dot-dash line in the figure. Then, it is possible to estimate an allowable fatigue life closer to the actual life.

In step S13, the non-destructive sensor 12, according to the eddy current testing, detects the fatigue crack depth that is the depth of the fatigue damage part pf the pressure accumulator 10 at the minimum initial flaw generation time point, and the estimation unit 13 determines whether the fatigue crack depth is detected. When in step S13, the fatigue crack depth is detected, the processing proceeds to step S14. When in step S13, the fatigue crack depth is not detected, the processing proceeds to step S15.

In step S13, the AE sensors 11a and 11b may detect, from the damage AE signals, the fatigue crack depth of the fatigue damage part of the pressure accumulator 10 at the minimum initial flaw generation time point.

In step S14, the estimation unit 13 determines that the fatigue crack detected by the non-destructive sensor 12 according to the eddy current testing is generated, and estimates the allowable fatigue life of the pressure accumulator 10 from the fatigue crack. As described later, the size of the minimum flaw crack that is detected by the non-destructive sensor 12 according to the eddy current testing is 0.1 mm. Therefore, the fatigue crack to be detected in step S14 has a depth of 0.1 mm or more. Thus, it is determined as a prediction that a fatigue damage will be generated based on a previously investigated fatigue damage characteristic obtained from the fatigue crack detected by the non-destructive sensor 12, and the life of the pressure accumulator 10 is estimated.

Even when the fatigue damage characteristic from the fatigue crack is not clarified, the minimum flaw crack detected by the non-destructive sensor 12 according to the eddy current testing is 0.1 mm as described later, and the minimum flaw characteristic from the minimum flaw crack is previously investigated and clarified. Therefore, the fatigue damage characteristic may be estimated based on the comparison between the minimum flaw characteristic from the minimum flaw crack having a size of 0.1 mm that is detected by the eddy current testing and the estimation characteristic from the initial flaw having a size of 0.3 mm that is detected by the magnetic particle testing in step S12.

Step S14 may be carried out when for the estimation unit 13, the AE sensors 11a and 11b detects from the damage AE signals, the fatigue crack depth of the fatigue damage part of the pressure accumulator 10 at the minimum initial flaw generation time point. In this example, the estimation unit 13 determines that a flaw crack whose size corresponds to the values of the AE signals detected by the AE sensors 11a and 11b that correspond to the fatigue damage degree is generated. Then, the estimation unit 13 estimates the allowable fatigue life of the pressure accumulator 10 from the above flaw crack. The fatigue damage characteristic that is referred to in the estimation of the allowable fatigue life of the pressure accumulator 10 may be obtained in the same manner as in step S14. After step S14, the processing may end. The processing may proceed to step S16.

Since in step S13, the fatigue crack depth is not detected by the non-destructive sensor 12 according to the eddy current testing in step S13, in step S15, the estimation unit 13 determines that a crack having a size of 0.1 mm, which is the size of the minimum flaw crack that is detected at the minimum initial flaw generation time point by the non-destructive sensor 12 according to the eddy current testing is generated. The estimation unit 13 estimates the allowable fatigue life of the pressure accumulator 10 based on the minimum flaw characteristic from the minimum flaw crack. After step S15, the processing may end. The processing may proceed to step S16.

Figure 5:
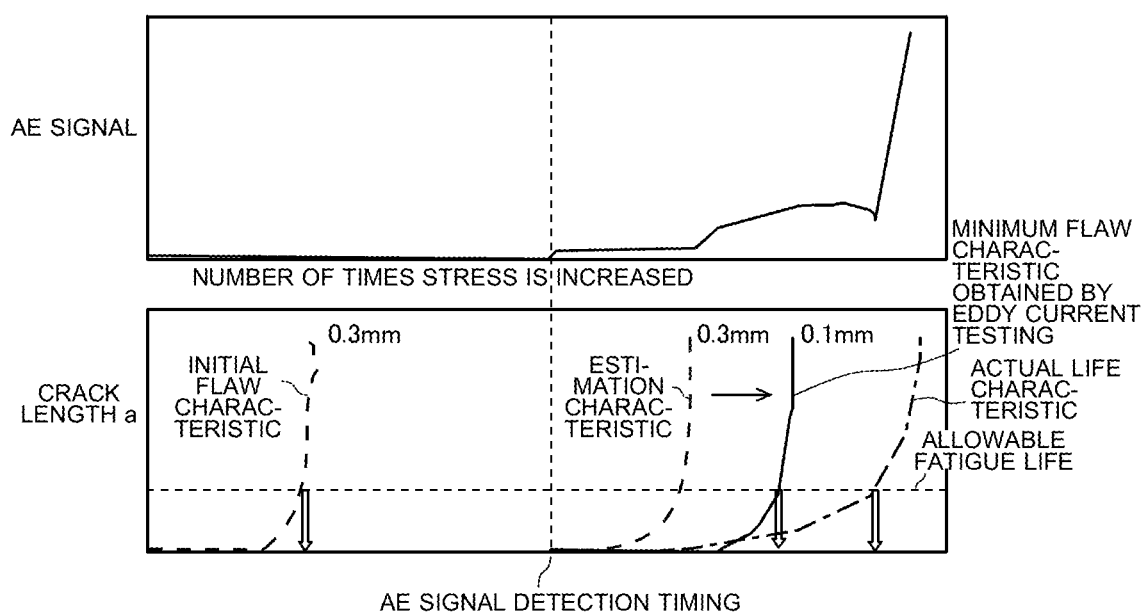
FIG. 5 is an explanatory diagram illustrating a correlation between the AE signals detected by the AE sensors and a minimum flaw characteristic for the life of the pressure accumulator based on an eddy current testing, according to the example.

FIG. 5 is an explanatory diagram illustrating a correlation between AE signals detected by the AE sensors 11a and 11b and the minimum flaw characteristic for the life of the pressure accumulator 10, according to the eddy current testing in the example. As illustrated in FIG. 5, since the fatigue crack depth is not detected by the non-destructive sensor 12 according to the eddy current testing, the estimation unit 13 determines the point of time at which first damage AE signals are detected, as the point of time at which a crack having a size of 0.1 mm which is the minimum flaw crack that can be detected by the non-destructive sensor 12 according to the eddy current testing is generated. Then, the estimation unit 13 estimates the allowable fatigue life of the pressure accumulator 10 from the minimum flaw crack having a size of 0.1 mm, from the temporal estimation characteristic that is indicated by a broken line, as a minimum flaw characteristic obtained using the non-destructive sensor 12 according to the eddy current testing, the minimum flaw characteristic being indicated by a solid line in the figure. The minimum flaw characteristic obtained using the non-destructive sensor 12 according to the eddy current testing is previously investigated. As a result, the minimum flaw characteristic further approaches the actual life characteristic indicated by a dash-dot-dash line in the figure, than the estimation characteristic. Then, it is possible to estimate an allowable fatigue life that is further close to the actual life.

In step S16, when the AE sensors 11a and 11b detect damage AE signals, a worker removes a fatigue damage part, for example, by polishing to extend the life of the pressure accumulator 10. The fatigue damage part is located from the difference between the damage AE signals detected by the AE sensors 11a and 11b. Therefore, since the depth of the fatigue crack at the time when first damage AE signals are detected is considered smaller than or equal to 0.3 mm, which is the size of the minimum crack depth according to the magnetic particle testing, a fatigue crack itself on an inner surface side of the metallic cylinder member 1a is removed. Therefore, the fatigue damage part is removed, and the life of the pressure accumulator 10 can be further extended. After step S16, the processing ends.

Modification of Life Estimation Apparatus 100 for Pressure Accumulator 10

Figure 6:
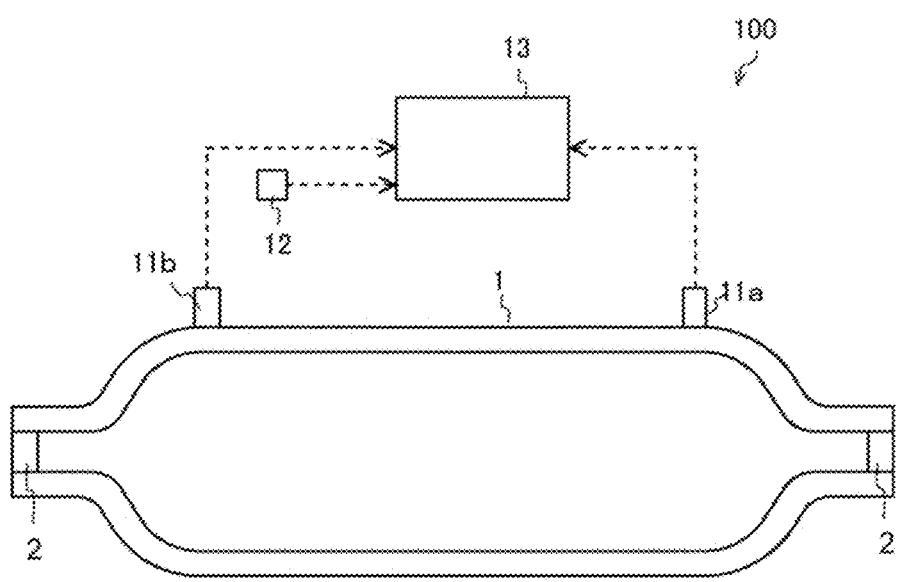
FIG. 6 is a schematic configuration diagram illustrating a life estimation apparatus for a pressure accumulator, in a modification of the example.

FIG. 6 is a schematic configuration diagram illustrating a life estimation apparatus 100 for a pressure accumulator 10, according to a modification of the example. The configurations of components other than the pressure accumulator 10 are the same as the configurations described above regarding the above example, and their descriptions will thus be omitted. The following description is made concerning configurations of the pressure accumulator 10 that are not described above.

In the container 1, at least one end side may be smaller in diameter than the body. FIG. 6 illustrates an example of the container 1 in which the both end sides of the container 1 are smaller in diameter than the body. In this example, the end sides of the container 1 are small in diameter and formed hemispherically, forming shoulder portions of a tank type container. Lid members 2 are provided at opened portions of the both end portions of the container 1. Since the container 1 is a tank type container, the two AE sensors 11a and 11b are provided at the container 1.

Example

Figure 7:
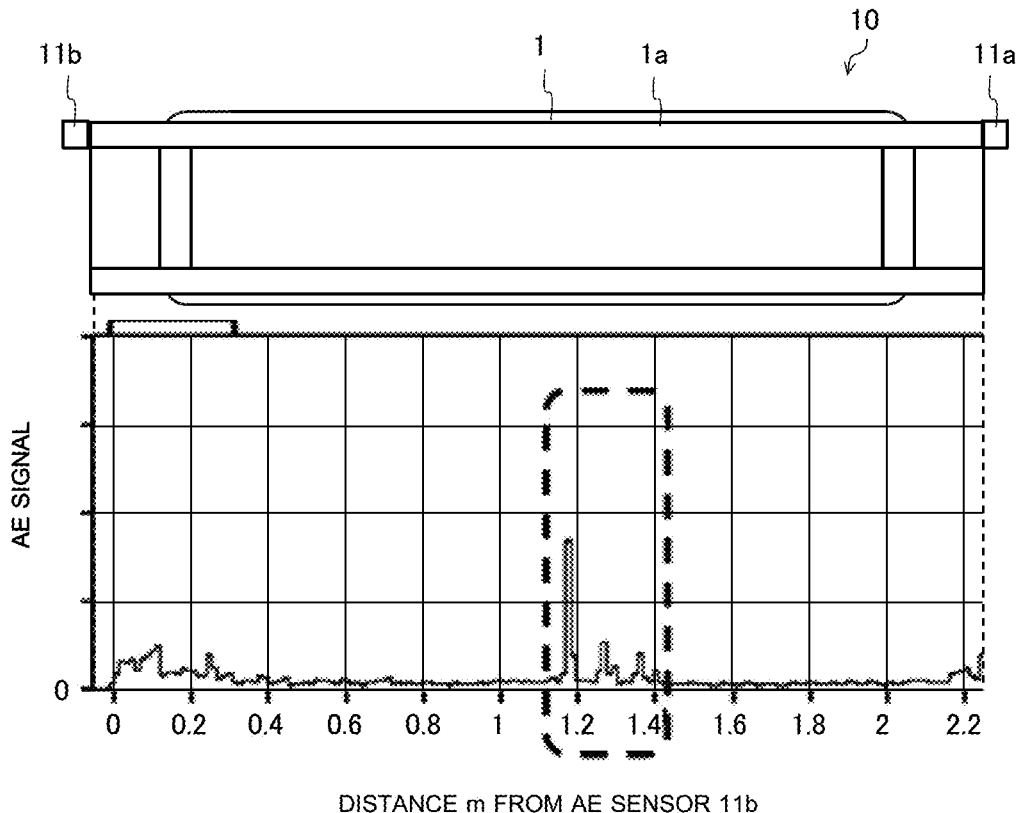
FIG. 7 is an explanatory diagram indicating a location result based on AE signals detected by AE sensors in an example.

FIG. 7 is an explanatory diagram illustrating a location result based on the AE signals from two AE sensors 11a and 11b in an example. We performed a position location based on AE signals detected by the two AE sensors 11a and 11b using the life estimation apparatus 100 for the pressure accumulator 10 according to the example and, as illustrated in FIG. 7, a damage part which causes a damage AE signal to be generated and whose fatigue crack depth is very shallow could be detected. The location result as indicated in FIG. 7 was obtained by the process of step S11 in the flowchart of FIG. 3.

After the location result in FIG. 7 was obtained, the point of time at which the damage AE signal was detected was set as the initial flaw generation time point by the process of step S12 in the flowchart of FIG. 3, and the fatigue crack depth was detected by the non-destructive sensor 12 according to the eddy current testing in the process of step S13. The damage part was detected as a flaw that has a size of 0.1 mm from the inner surface of the container 1 of the pressure accumulator 10, in the vicinity of the center in the longitudinal direction of the container 1, by the non-destructive sensor 12 according to the eddy current testing (ET). The total length of the container 1 was 2.2 m. The damage part appeared in a range indicated by a broken line in FIG. 7, and was conspicuous at a position located from the AE sensor 11b by approximately 1.2 m. The damage part could not be detected from the inner surface or outer surface of the container 1 by ultrasonic testing (UT) and penetrant testing (PT) that have been used in the past.

Figure 8:
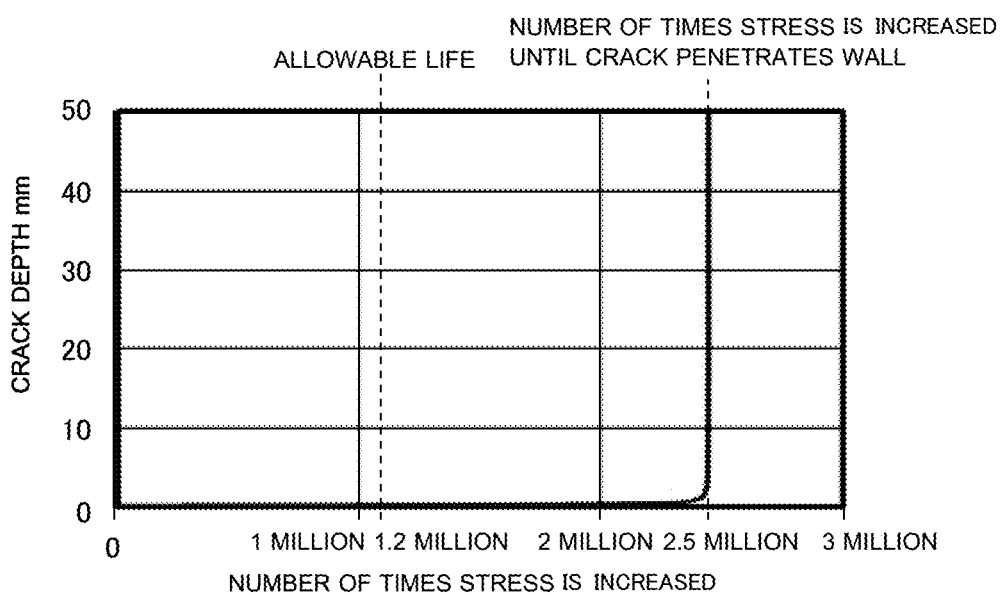
FIG. 8 is an explanatory diagram illustrating the result of estimation of an allowable life in the example.

FIG. 8 is an explanatory diagram illustrating the result of estimation of the allowable life in the example. As indicated in FIG. 8, the allowable life from the fatigue crack depth could be estimated in the process of step S14. To be more specific, after the 0.1 mm flaw is detected, this flaw was set as the initial flaw, and analyzed how much the flaw grows due to cyclic fatigue. The analysis method complies with KHKS 0220 (2016) standard regarding ultra-high pressure gas facilities that is set by the High Pressure Gas Safety Institute of Japan. As a result, the number of repetitions that is the number of times the internal pressure was raised so that the flaw grow to penetrate the container 1 having a thickness of 50 mm was approximately 2.5 million. An allowable cycle life defined as a life for which a safety factor is considered is estimated to be half of a cycle life in which the depth of the flaw reaches a value obtained by multiplying the thickness of the container 1 by 0.8. To be more specific, the allowable number of repetitions is approximately 1.2 million, which is half of a cycle number of approximately 2.5 million that is the number of repetitions required until the depth of the crack reaches 40 mm that is a value obtained by multiplying 50 mm that is the thickness of the container 1, by 0.8 that is the safety factor. As described above, the estimation of the allowable life from the fatigue crack depth that is made as the process of step S14 could be verified.

Advantages of the Example

The life estimation apparatus 100 for the pressure accumulator 10 estimates the life of the pressure accumulator 10 based on AE signals. The life estimation apparatus 100 includes the AE sensors 11a and 11b that detect AE signals. The AE sensors 11a and 11b are provided at the pressure accumulator 10. The life estimation apparatus 100 includes the estimation unit 13 that sets the point of time at which the AE sensors 11a and 11b detect damage AE signals that are generated from the pressure accumulator 10 because damage of the material during use of the pressure accumulator 10, as the minimum initial flaw generation time point that is the point of time at which a minimum initial flaw of the pressure accumulator 10 that is detected by the non-destructive inspection method is generated in the shipping of the pressure accumulator 10.

In the above configuration, with reference to the time point at which the AE sensors 11a and 11b detect the damage AE signals for the first time, it is assumed that a fatigue damage that is comparable in degree to the minimum initial flaw in the shipping of the pressure accumulator 10 is generated, and it is possible to determine as a prediction that a fatigue damage will generate based on a previously investigated initial flaw characteristic from the fatigue damage comparable to the minimum initial flaw at the time of the shipping, and estimate the life of the pressure accumulator 10. Thus, for example, even by annual safety inspection, it is possible to estimate the life of the pressure accumulator 10 at the point of time at which first damage AE signals are detected. Therefore, it is possible to easily estimate the life of the pressure accumulator 10 based on the AE signals.

In the example, as the AE sensors 11a and 11b, two or more AE sensors are provided. The estimation unit 13 locates a fatigue damage part of the pressure accumulator 10 based on the relative difference between damage AE signals detected by the two or more AE sensors 11a and 11b.

In the above configuration, it is possible to locate a fatigue damage part of the pressure accumulator 10 based on the relative difference between the damage AE signals detected by the two or more AE sensors 11a and 11b. Thus, it is possible to easily apply the non-destructive sensor 12 or other sensors to the located fatigue damage part. Therefore, since the fatigue damage part is located, the time required for the inspection using the non-destructive sensor 12 or other sensors is short.

The life estimation apparatus 100 includes the non-destructive sensor 12 that detects a fatigue crack depth according to the non-destructive inspection method. The non-destructive sensor 12 performs a detection operation to detect the fatigue crack depth that is the depth of a fatigue damage part of the pressure accumulator 10 at the minimum initial flaw generation time point. When the non-destructive sensor 12 does not detect the fatigue crack depth, the estimation unit 13 determines that a minimum flaw crack to be detected at the minimum initial flaw generation time point by the non-destructive sensor 12 is generated, and estimates an allowable fatigue life of the pressure accumulator 10 from the minimum flaw crack.

In the above configuration, the non-destructive sensor 12 performs the detection operation to detect the fatigue crack depth of the fatigue damage part of the pressure accumulator 10 at the minimum initial flaw generation time point. Then, when the non-destructive sensor 12 does not detect the fatigue crack depth, with reference to the time point at which the AE sensors 11a and 11b detect damage AE signals for the first time, it is assumed that a minimum flaw crack that is to be detected as the smallest flaw crack by the non-destructive sensor 12 is generated. Then, it is possible to determine as a prediction that a fatigue damage will generate based on a previously investigated minimum flaw characteristic from the minimum flaw crack as the smallest flaw crack that is to be detected by the non-destructive sensor 12, and also estimate the life of the pressure accumulator 10.

According to the example, the AE sensors 11a and 11b detect the fatigue crack depth that is the depth of the fatigue damage part of the pressure accumulator 10 at the minimum initial flaw generation time point, from the damage AE signals detected by the AE sensors 11a and 11b, and the estimation unit 13 determines that a flaw crack that corresponds to the values of the damage AE signals that correspond to a fatigue damage degree is generated, and estimates the allowable fatigue life of the pressure accumulator 10 from the above flaw crack.

In the above configuration, the AE sensors 11a and 11b detect the fatigue crack depth of the fatigue damage part of the pressure accumulator 10 at the minimum initial flaw generation time point. Then, with reference to the time point at which the AE sensors 11a and 11b detect damage AE signals for the first time, it is assumed that a flaw crack that corresponds to the values of the damage AE signals detected by the AE sensors 11a and 11b that correspond to the fatigue damage degree is generated, and it is possible to determine as a prediction that a fatigue damage will generate based on a previously investigated or estimated flaw characteristic from the flaw crack, and also estimate the life of the pressure accumulator 10.

According to the example, the pressure accumulator 10 includes the container 1 that is made of metal and has opened portion. Also, the pressure accumulator 10 includes the lid members 2 provided at the opened portions of the container 1 to close the opened portions.

In the above configuration, it is possible to easily estimate the life of the pressure accumulator 10 including the container 1 made of metal.

According to the example, the AE sensors 11a and 11b are provided at the container 1 and/or the lid members 2.

In the above configuration, using the AE sensors 11a and 11b, it is possible to detect a fatigue damage of the container 1 as AE signals.

According to the example, the container 1 is a metallic cylinder member 1a. The both end portions of the metallic cylinder member 1a are opened. The lid members 2 close the opened portions of the both end portions of the metallic cylinder member 1a.

In the above configuration, it is possible to easily estimate the life of the pressure accumulator 10 including the metallic cylinder member 1a.

According to the example, the pressure accumulator 10 includes the carbon-fiber reinforced resin member 4 that covers the outer circumferential portion of the metallic cylinder member 1a.

In the above configuration, since the carbon-fiber reinforced resin member 4 covers the outer circumferential portion of the metallic cylinder member 1a, the durability of the metallic cylinder member 1a can thus be improved.

According to the example, in the life extension method for the pressure accumulator 10, in the above life estimation apparatus 100 for the pressure accumulator 10, when the AE sensors 11a and 11b detect damage AE signals, a fatigue damage part is removed, and the life of the pressure accumulator 10 is thus extended.

In the above configuration, since the fatigue damage part is removed, the life of the pressure accumulator 10 can be further extended.

The invention claimed is:

1. A life estimation apparatus for a pressure accumulator that estimates a life of the pressure accumulator based on an AE signal for the pressure accumulator, the life estimation apparatus comprising:
   an AE sensor provided at the pressure accumulator and configured to detect the AE signal; and
   an estimator configured to set a point of time at which the AE sensor detects a damage AE signal generated from the pressure accumulator because of damage of a material during use of the pressure accumulator, as a minimum initial flaw generation time point, wherein the life estimation apparatus is configured to estimate the life of the pressure accumulator, with reference to the set point of time, upon assumption, that a fatigue damage is generated that is comparable to a minimum initial flaw of a pressure accumulator that is detectable by a non-destructive sensor at a time of shipping, based on a previously investigated fatigue damage characteristic for the life of a pressure accumulator.

2. The life estimation apparatus of claim 1, wherein
   two or more AE sensors including the AE sensor are provided, and
   the estimator locates a fatigue damage part of the pressure accumulator based on a relative difference between damage AE signals detected by the two or more AE sensors.

3. The life estimation apparatus of claim 1, further comprising a non-destructive sensor configured to detect a fatigue crack depth according to the non-destructive inspection method,
   wherein the non-destructive sensor performs a detection operation to detect as the fatigue crack depth, a depth of a fatigue damage part of the pressure accumulator at the minimum initial flaw generation time point, and when the fatigue crack depth is not detected, the estimator determines that a minimum flaw crack that is to be detected by the non-destructive sensor at the minimum initial flaw generation time point is generated, and estimates an allowable fatigue life of the pressure accumulator based on the previously investigated fatigue damage characteristic from the minimum flaw crack.

4. The life estimation apparatus of claim 1, wherein from the damage AC signal, the AE sensor detects as a fatigue crack depth, a depth of a fatigue damage part of the pressure accumulator at the minimum initial flaw generation time point, and the estimator determines that a flaw crack corresponding to a value of the AE signal that corresponds to a fatigue damage degree is generated, and estimates an allowable fatigue life of the pressure accumulator based on the previously investigated fatigue damage characteristic from the flaw crack.

5. The life estimation apparatus of claim 1, wherein the pressure accumulator comprises:
   a container made of metal and has an opened portion; an
   a lid member provided at the opened portion of the container to close the opened portion.

6. The life estimation apparatus of claim 5, wherein AE sensors including the AE sensor are provided at one or both of the container and the lid member.

7. The life estimation apparatus of claim 5, wherein
   the container is a metallic cylinder member having both end portions that are opened, and
   lid members including the lid member are provided to close the opened end portions of the metallic cylinder member.

8. The life estimation apparatus of claim 7, wherein the pressure accumulator comprises a carbon-fiber reinforced resin member that covers an outer circumferential portion of the metallic cylinder member.

9. A life extension method for the pressure accumulator, comprises a step of removing a fatigue damage part to extend the life of the pressure accumulator, when the AE sensor detects the damage AE signal in the life estimation apparatus of claim 1.

* * * * *